United States Patent [19]
Warlop et al.

[11] 3,942,827
[45] Mar. 9, 1976

[54] MECHANICAL CONTROL DEVICE FOR A DISC BRAKE

[75] Inventors: Fernand Warlop, Aulnay-sous-Bois; Jean-Claude Mery, Pavillon-sous-Bois, both of France

[73] Assignee: Societe Anonyme D.B.A., Paris, France

[22] Filed: Mar. 6, 1975

[21] Appl. No.: 556,052

[52] U.S. Cl. ...... 188/196 BA; 188/71.9; 192/111 A
[51] Int. Cl.[2] .......................................... F16D 65/56
[58] Field of Search ........ 188/71.9, 196 BA, 196 D; 192/111 A

[56] References Cited
UNITED STATES PATENTS

| | | | |
|---|---|---|---|
| 2,203,890 | 6/1940 | Browall et al. | 188/196 D |
| 3,550,732 | 12/1970 | Beller | 188/71.9 X |
| 3,747,711 | 7/1973 | Burnett | 188/71.9 |

FOREIGN PATENTS OR APPLICATIONS

| | | | |
|---|---|---|---|
| 799,577 | 8/1958 | United Kingdom | 188/71.9 |

*Primary Examiner*—George E. A. Halvosa
*Attorney, Agent, or Firm*—Ken C. Decker; William N. Antonis

[57] ABSTRACT

The invention relates to a mechanical control device for a disc brake. The mechanical control device comprises two members 28, 32, 128, 132 extensible in an axial direction with respect to the brake disc upon relative rotation therebetween. These members are respectively connected to a control member 34, 134 and to a piston 20, 120 associated with a friction member 22, 122. Adjusting means 56, 156 comprise an annular element 58, 158 cooperating by way of one-way toothings 60, 62 with the member 28, 128 connected to the control member in order to turn relative to member 28, 128 upon brake actuation, when the wear of the friction member 22, 122 is greater than a predetermined value. Upon return of the control member 34, 134 to its idle position, a friction spring 48, 148 inserted between the piston 20, 120 and the member 28, 128 permits this member 28, 128 to turn relative to member 32, 132, thus adjusting for the wear of friction member 22, 122.

6 Claims, 5 Drawing Figures

MECHANICAL CONTROL DEVICE FOR A DISC BRAKE

The invention relates to a mechanical control device for effecting operation of a friction member belonging to a brake mechanism.

More particularly, the invention concerns a mechanical control device comprising a housing in which a bore slidable receives a piston adapted to be associated with the friction member, two members extensible along the axis of the bore, and a control member which is connected to a first one of the extensible members and of which rotation in the direction corresponding to operation of the brake mechanism causes the second extensible member to extend from the first member, so urging the piston in the direction corresponding to operation of the friction member, adjusting means being provided to take up wear on the friction member.

Control devices of this type are generally used in emergencies and for parking, as an addition to a principal, hydraulic control device. In this case the adjusting means are associated with the principal hydraulic control device and do not enable wear on the friction member to be taken up when the brake is operated mechanically.

Other mechanical control devices, however, are designed to effect service braking with a brake mechanism, for example where the brake circuit is pneumatic. Here the adjusting means permitting the take-up of wear on the friction member must be operated by the mechanical control device. In such cases the adjusting means almost always introduce a large number of components into the housing of the device, greatly reducing the reliability of the assembly and increasing the overall dimensions of the control device.

An object of the invention is to provide a mechanical control device which can effect principal operation of a brake mechanism and in which the adjusting means are simpler and less bulky than the means known in the art.

To this end, a mechanical control device according to the invention is characterized in that the adjusting means comprise an element normally connected to the first extensible member by one-way transmission means enabling the element to turn relative to the first extensible member through an angle corresponding to the wear on the friction member beyond a predetermined value upon operation of the control member, resilient coupling means then coupling the second extensible member and the piston but enabling the element to cause the second extensible member to turn through said angle so that it extends from the first extensible member upon return of the control member to its idle position.

In a preferred embodiment of the invention, the said element or the second extensible member are aligned on the axis of the bore and comprise at least one arcuate aperture which receives an axial rod associated with the second extensible member or the said element respectively, the length of the arc determining the present value beyond which the second extensible member rotates the said element upon operation of the control member.

In this embodiment, preferably, the said element is slidable on the first extensible member and comprises, in a plane perpendicular to the axis of the bore, toothing urged into engagement with corresponding toothing provided on the first extensible member by resilient means anchored against the first extensible member, both sets of toothing being formed of teeth inclined relative to the axis of the bore to form the one-way transmission means.

The invention will now be described with reference to the accompanying drawings, in which.

Figure 1:
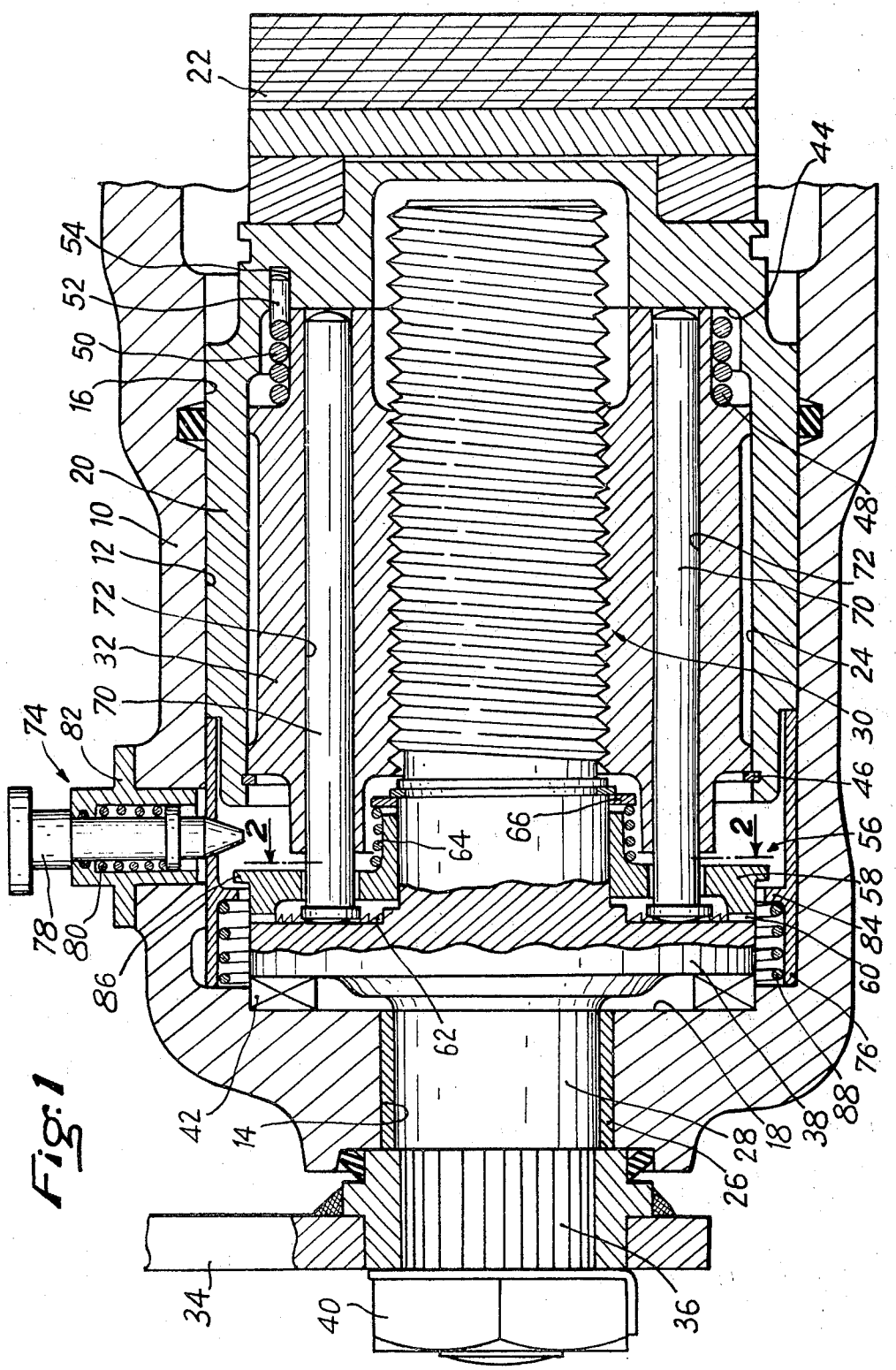
FIG. 1 shows a section through a first mechanical control device embodying the invention.

The control device illustrated in FIG. 1 has a housing 10 containing a bore 12. The bore 12 has a portion 14 of smaller diameter and a portion 16 of larger diameter, separated by a shoulder 18. The large-diameter portion 16 slidably receives a nonrotatable piston 20, to whose free end a friction member 22 is fixed. The piston 20 contains a blind bore 24 at the end facing the small-diameter portion 14 of the bore 12. This small-diameter portion 14 rotatably receives, by way of a bush 26, a first extensible member 28 to which threads 30, or the like, connect a second extensible member 32 rotatably mounted in the bore 24 in the piston 20. The meshing threads 30 are designed so that relative rotation of the members 28, 32 causes the assembly formed by these two members to extend or retract in a direction parallel to the axis of the bore 12.

The extensible member 28 projects from the housing 10 to receive a control member or lever 34 on grooves or splining 36. Inside the housing 10 the extensible member 28 comprises a plate-forming portion 38 facing the shoulder 18 in the bore 12. The member 28 and lever 24 are prevented from carrying out translatory motion relative to the housing 10 by a nut 40 screwed on to the free end of the member 28 and by the plate-forming portion 38, which co-operates with the shoulder 18 by way of a roller thrust bearing or the like shown diagrammatically at 42 and permitting the assembly to turn relative to the housing 10.

To prevent translatory motion of the extensible member 32 relative to the piston 20, the member 32 is locked in position between an abutment surface 44 in the bore 24 in the piston and a ring 46 lodged in a groove in the piston. Resilient coupling means formed by a spring 48 made a rotational connection between the piston 20 and the extensible member 32. The spring 48 is coiled round a portion 50 of reduced diameter of that end of the member 32 co-operating with the abutment 44. The internal diameter of the spring 48 when unstressed is normally less than the diameter of the portion 50, and one end 52 of the spring 48 axially enters a bore 54 in the end of the bore 24 in the piston 20. The piston 20 and extensible member 32 are therefore rotationally connected when they are urged in the direction which causes the spring 48 to tighten round the portion 50. When the piston 20 and member 32 are rotated relative to one another in the opposite direction, however, the spring 48 loosens and allows relative rotation of them.

Figure 2:
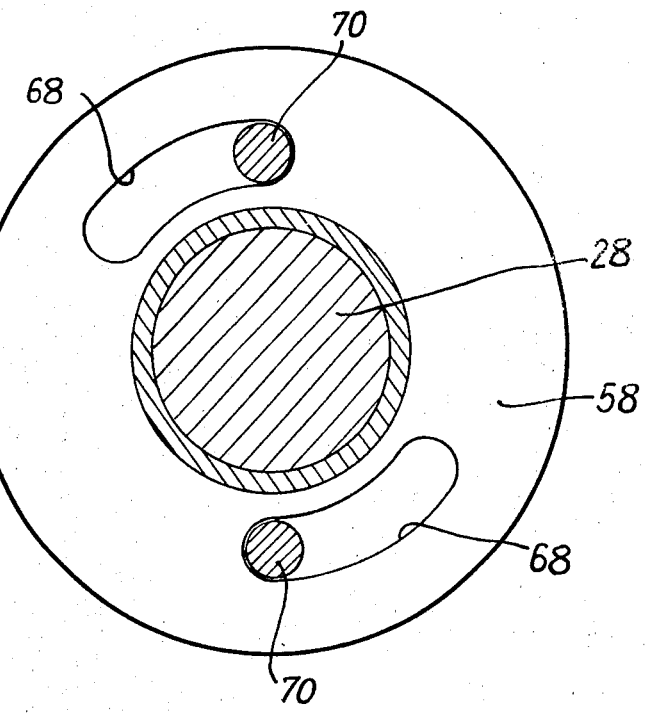
FIG. 2 is a section along a line 2—2 in FIG. 1.
Figure 3:
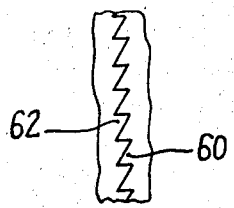
FIG. 3 shows a detail of the device shown in FIG. 1.

Adjusting means generally designated 56 are provided to take up wear on the friction member 22 when it is operated by the control device. The adjusting means 56 comprise an element 58 slidably and rotatably mounted on the member 28, between the plate-forming portion 38 and the threads 30. The element 58 has on its periphery, on the side facing the plate-forming portion 38 of the member 28, toothing 60 co-operating with similar toothing 62 on the portion 38. As FIG. 3 shows, the two sets of toothing 60, 62 are formed, in a plane substantially perpendicular to the axis of the bore 12, of teeth inclined relative to the axis of the bore to form one-way transmission means. The teeth 60, 62 are urged into engagement by a spring 64 pre-stressed between a retainer ring 66, locked in position axially relative to the member 28, and the element 58. The teeth 60, 62 are so formed that the element 58 can turn relative to the member 28 when the lever 34 urges the latter in the direction corresponding to operation of the control device, whereas the teeth prevent the element 58 from turning in the opposite direction. As FIG. 2 shows, the element 58 contains two diametrically opposite arcuate apertures 68 which respectively receive two rods 70 substantially parallel to the axis of the bore 12. The rods are locked in position in two diametrically opposite bores 72 in the extensible member 32.

Removal means 74 are provided to return the extensible members 28, 32 to their initial positions when the friction member 22 is worn. The removal means 74 comprise a sleeve 76 mounted in the large-diameter portion 16 of the bore 12, near the shoulder 18. The sleeve 76 is normally locked in this position by the end of a plunger 78 biased into engagement with an aperture in the sleeve 76 by a spring 80 bearing on a detachable portion 82 of the housing 10. The sleeve 76 has a portion 84 capable of engaging a corresponding portion 86 of the element 58 under the influence of a pre-stressed spring 88 whose initial tension is substantially greater than that of the spring 64. When an operator pulls the plunger 78, counteracting the spring 80, therefore, the sleeve 76 is released in respect of translation and its portion 84 engages the portion 86 of the element 58 and moves it to the right, counteracting the spring 64 and disengaging the teeth 60,62.

The mechanical control device just described operates as follows:

At rest, and when the friction member 22 is new, the various components of the device occupy the positions shown in FIGS. 1 and 2. When the control lever 34 is turned in the direction corresponding to application of the brake, it entrains the extensible member 28 which in turn urges the member 32 to rotate. As already stated, when the member 32 is urged to rotate in this direction, the spring 48 prevents it from rotating relative to the piston 20, so that the member 32 and piston 20 move to the right in FIG. 1 along the co-operating threads 30. The friction member 22 is thereby moved to the right in FIG. 1 to operate the brake mechanism.

When the control member 34 returns to its idle position, the frictional engagement between the spring 48 and member 32 is sufficient to immobilize the latter relative to the piston 20 and so to ensure that the friction member 22 returns to its idle position.

The element 58 is normally urged towards the plate-forming portion 38 of the member 28 by the spring 64, so that the teeth 60,62 mesh. On account of the arcuate shape of the apertures 68 in the element 58, the latter therefore normally turns at the same time as the member 28 when the rotation required of this member to apply the friction member 22 to the associated friction surface (not shown) is less than a value preset by the arc of the apertures 68. When, upon operation of the control member 34, the member 28 turns through an angle greater than the preset angle defined by the apertures 68, the member 32 is then connected to the piston 20, so that the element 58 is locked in respect of rotation by the rods 70 and so jumps one or more teeth in the toothing 62 on the plate-forming portion 38 of the extensible member 28. The element 58 therefore turns through an angle corresponding to the wear on the lining of the friction member 22 beyond a value preset by the angle defined by the arcuate apertures 68. When the control lever 34 returns to its idle position, the extensible member 28 turns in a direction such that the element 58 cannot rotate relative to it. As a result, when the ends of the apertures 68 abut again on the axial rods 70, the element 58 tends to entrain the extensible member 32 and to rotate it relative to the piston 20. As already stated, the spring 48 is then urged in a direction such that it permits this relative rotation of the member 32 and piston 20. The member 32 therefore turns about the member 28 through an angle corresponding to the wear on the lining of the friction member 22 beyond the preset value, and so moves to the right in FIG. 1 relative to the member 28.

When the lining of the friction member 22 is worn, the assembly formed by the two extensible members 28, 32 must be returned to the initial position, shown in FIG. 1. To do this, an operator pulls the plunger 78, so releasing the energy stored in the spring 88 which acts by way of the portion 84 on the portion 86 of the element 58, counteracting the spring 64. As already stated, the energy stored in the spring 88 is greater than that stored in the spring 64, so that the element 58 is urged to the right and disengages its teeth 60 from the teeth 62 on the plate-forming portion 38 of the member 28. The operator can now turn the control lever 34 in the direction corresponding to the return of the device to its idle position, until the members 28, 32 occupy the mutually relative positions shown in FIG. 1. The plunger 78 is then simply pushed in again to relock the removal device 74, and the worn friction member is replaced with a new one.

Figure 4:
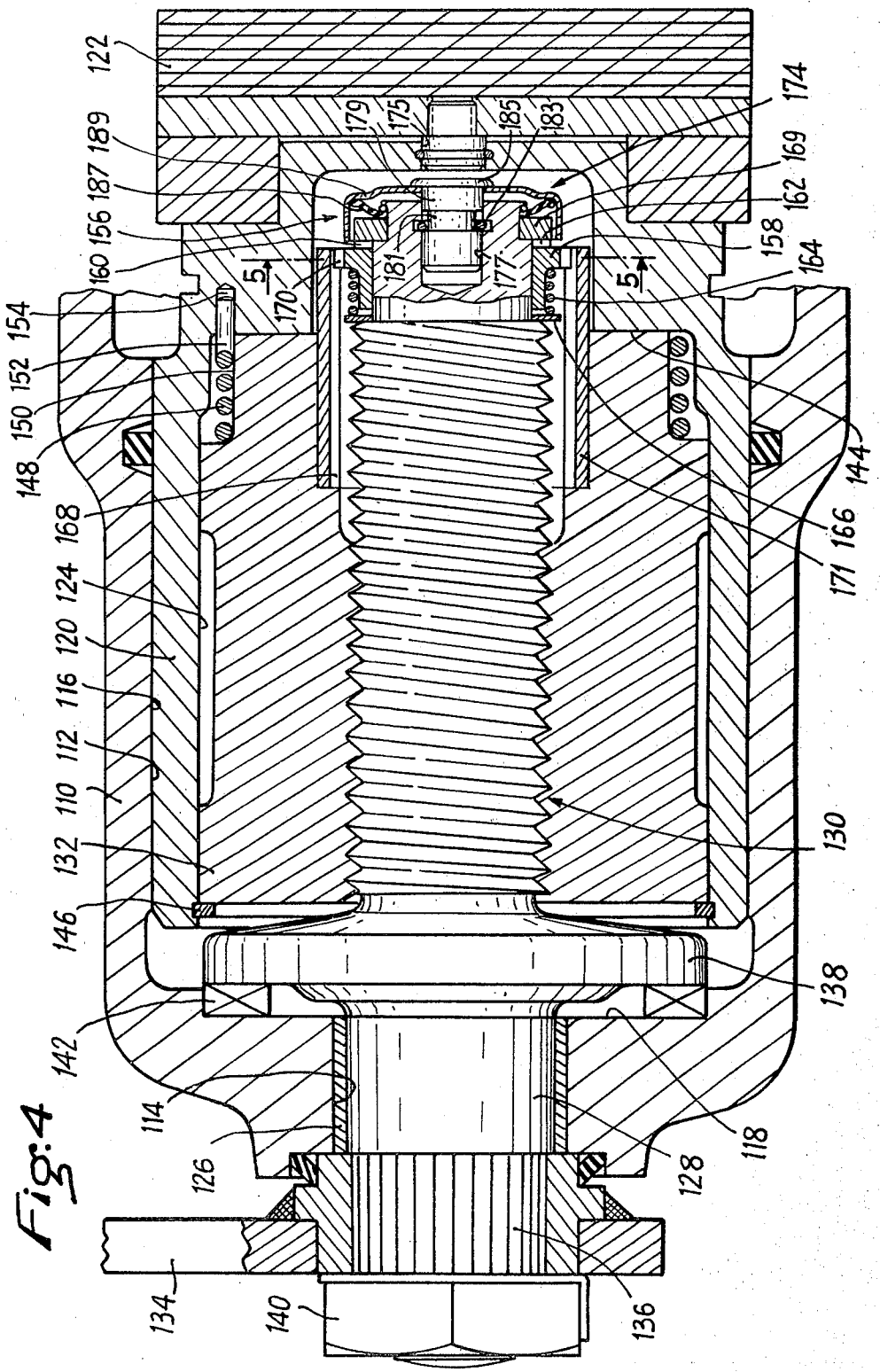
FIG. 4 represents a second mechanical control device embodying the invention.

FIG. 4 illustrates another mechanical control device embodying the invention. Like reference numerals plus 100 designate components fulfilling the same function as those in the first embodiment.

Figure 5:
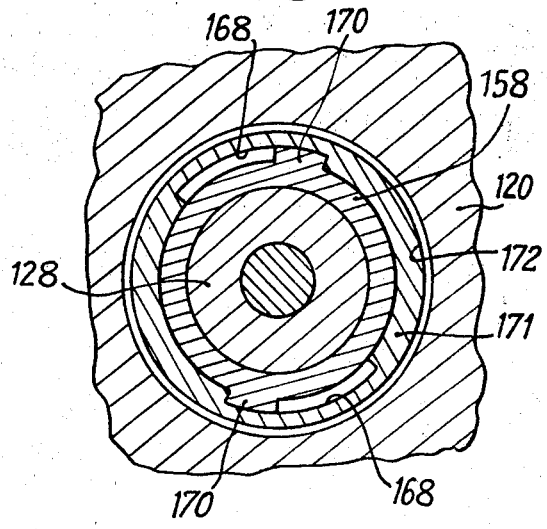
FIG. 5 is a section on a line 5—5 in FIG. 4.

The device shown in FIG. 4 differs from that shown in FIG. 1 only in the arrangement of the adjusting means 156 and of the removal means 174. The adjusting means 156 comprise an element 158 slidable and rotatable on that end of the extensible member 128 remote from the lever 134. A pre-stressed spring 164 bearing on a retainer ring 166 associated with the member 128 biases the element 158 to carry out translatory motion towards an annular element 169 fixed to the free end of the member 128. The elements 158, 169 thus co-operate by respective sets of toothing 160, 162 of the same type as the toothing 60, 62 in the first embodiment. As FIG. 5 shows, the outer periphery of the element 158 bears two diametrically opposite lugs 170 co-operating with arcuate grooves 168 in a sleeve 171 attached to the extensible member 132.

The removal means 174 comprise an aperture 175 coaxial with the bore 112 and formed in that end of the nonrotatable piston 120 bearing the friction member 122. Opposite the aperture 175 the extensible member 128 contains a blind bore 177 receiving a cylindrical releasing member 179 which contains a groove 181. A circlip 183 or the like is mounted in the member 128 opposite the groove 181, so that the releasing member 179 can move axially over a distance greater than the depth of the toothing 160,162. At the end facing the aperture 175 the releasing member 179 bears a head 185, on to which a resilient element 187 urges a dish 189. The dish 189 encloses the element 169, and its free end aligns with the element 158.

The mechanical control device just described with reference to FIGS. 4 and 5 operates as follows.

When idle, the various components of the device occupy the positions shown in FIG. 4. When the control lever 134 is moved in the direction corresponding to operation of the device, as in the previous embodiment, it rotates the member 128 which, by way of the co-operating threads 130, urges the member 132 and piston 120 to the right in FIG. 4 and thereby applies the friction member 122 to the associated friction surface (not shown). Upon operation of the device, the element 158 is rotated by the member 128 by way of the toothing 160, 162, whereas the sleeve 171 is prevented from rotating by the member 132. As FIG. 5 shows, therefore, once the wear on the lining of the friction member 122 requires rotation of the member 128 relative to the member 132 greater than the rotation required of the lugs 170 of the element 158 to engage the other ends of the grooves 168, the spring 164 is compressed and enables the toothing 160 to turn by one or more teeth relative to the toothing 162. When the control lever 134 is returned towards its idle position, the element 150 can no longer turn relative to the member 128, whereas the member 132 and sleeve 171 can turn relative to the piston 120. As a result, when the element 158 has turned relative to the member 128 upon operation of the device, the element 158 causes the sleeve 171 and member 132 to rotate relative to the member 128 through an angle corresponding to the number of teeth jumped between the sets of toothing 160, 162 upon operation of the device. Wear on the friction member 122 beyond a distance predetermined by the grooves 168 and lugs 170 is therefore taken up automatically due to extension of the member 132 from the member 128.

Replacement of the friction member 122 and the return of the device to the initial position shown in FIG. 4 are carried out as follows.

The operator detaches the worn friction member 122 and thereby reveals the aperture 175 in the end of the piston 120. By passing an appropriate tool such as a screwdriver through this aperture, he pushes the head 185 towards the member 128, so that the resilient element 187 is compressed and the edges of the dish 189 push the element 158 off the toothing 162. The members 128, 132 are now free to turn relative to one another, so that the operator can easily return them to their original position by rotating the control lever 134 in the direction corresponding to return of the device to its initial position. It is then easy to put on a new friction member 122.

It will be noted that the assembly formed by the axial rods 70 and by the apertures 72 in the first embodiment, or by the lugs 170 and the grooves 168 in the second embodiment, operates irrespective of the number of rods or lugs, and that the latter may be on the element 58, 158 or on the second extensible member 32, 132, without exceeding the scope of the invention.

We claim:

1. A mechanical control device for effecting operation of a friction member belonging to a brake mechanism, comprising a housing in which a bore slidably receives a piston adapted to be associated with the friction member, two members extensible along the axis of the bore, and a control member which is connected to a first one of the extensible members and of which rotation in the direction corresponding to operation of the brake mechanism causes the second extensible member to extend from the first member, so urging the piston in the direction corresponding to operation of the friction member, adjusting means being provided to take up wear on the friction member, characterized in that the adjusting means comprise an element normally connected to the first extensible member by one-way transmission means enabling said element to turn relative to the first extensible member through an angle corresponding to the wear on the friction member beyond a predetermined value upon operation of the control member, resilient coupling means then coupling the second extensible member and the piston, but enabling said element to cause the second extensible member to turn through said angle so that it extends from the first extensible member upon return of the control member to its idle position.

2. A control device as claimed in claim 1, characterized in that said element or the second extensible member is aligned on the axis of the bore and comprise at least one arcuate aperture which receives an axial rod associated with the second extensible member or said element respectively, the length of the arc determining the predetermined value beyond which the second extensible member rotates said element upon operation of the control member.

3. A control device as claimed in claim 1 in that said element is slidable on the first extensible member and comprises, in a plane substantially perpendicular to the axis of the bore, toothing urged into engagement with corresponding toothing associated with the first extensible member by resilient means anchored against the latter, both sets of toothing being formed of teeth inclined relative to the axis of the bore to form the one-way transmission means.

4. A control device as claimed in claim 3, characterized in that the resilient means comprise a spring prestressed between abutment means associated with the first extensible member and said element.

5. A control device as claimed in claim 1, characterized in that the resilient coupling means comprise a spring which is coiled around a smaller-diameter portion of the second extensible member and of which the internal diameter when unstressed is less than the diameter of the smaller-diameter portion, one end of the spring being associated with the piston, the spring being coiled in a direction such that the second extensible member is attached to the piston when the control member is operated.

6. A control device as claimed in claim 1, characterized in that the second extensible member or said element bears at least one axial groove which receives a lug associated with the element or with the second extensible member respectively and capable of turning in the groove through an angle defining the predetermined value beyond which the second extensible member rotates the element upon operation of the control member.

* * * * *